US012004677B2

United States Patent
Junge et al.

(10) Patent No.: US 12,004,677 B2
(45) Date of Patent: Jun. 11, 2024

(54) JAPANESE-STYLE ICED COFFEE MAKER

(71) Applicant: Haier US Appliance Solutions, Inc., Wilmington, DE (US)

(72) Inventors: Brent Alden Junge, Evansville, IN (US); Danister Abeygunawardana, Jeffersonville, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 238 days.

(21) Appl. No.: 17/371,203

(22) Filed: Jul. 9, 2021

(65) Prior Publication Data
US 2023/0008685 A1 Jan. 12, 2023

(51) Int. Cl.
| | |
|---|---|
| A47J 31/00 | (2006.01) |
| A23F 5/26 | (2006.01) |
| A47J 31/057 | (2006.01) |
| A47J 31/06 | (2006.01) |
| A47J 31/36 | (2006.01) |
| A47J 31/46 | (2006.01) |
| A47J 31/54 | (2006.01) |
| F25C 1/00 | (2006.01) |

(52) U.S. Cl.
CPC ............... *A47J 31/002* (2013.01); *A23F 5/26* (2013.01); *A47J 31/057* (2013.01); *A47J 31/0668* (2013.01); *A47J 31/3676* (2013.01); *A47J 31/46* (2013.01); *A47J 31/54* (2013.01); *A47J 31/465* (2013.01); *F25C 1/00* (2013.01)

(58) Field of Classification Search
CPC .. A47J 31/465; A47J 31/4475; A47J 31/4478; A47J 31/057; A47J 31/02; A47J 31/04; A47J 31/3676; A47J 31/3623

USPC ................................................... 99/284, 304
See application file for complete search history.

(56) References Cited

U.S. PATENT DOCUMENTS

| | | | | |
|---|---|---|---|---|
| 4,508,023 | A * | 4/1985 | Naya ................... | A47J 31/0573 392/467 |
| 5,724,883 | A * | 3/1998 | Usherovich ............ | A47J 31/46 99/290 |
| 11,493,269 | B2 * | 11/2022 | Caswell ................... | B67D 3/00 |
| 2007/0017381 | A1 * | 1/2007 | Takizawa .............. | A47J 31/467 99/279 |
| 2015/0069087 | A1 * | 3/2015 | Brown ................. | B67D 1/0888 345/173 |
| 2016/0073819 | A1 * | 3/2016 | Licare ................... | A47J 31/467 99/300 |

FOREIGN PATENT DOCUMENTS

| | | | | |
|---|---|---|---|---|
| CN | 205214998 U | 5/2016 | | |
| JP | 59-7732 | * | 1/1984 | ............ A47J 31/057 |
| JP | H10295544 A | 11/1998 | | |
| JP | 2007301206 A | 11/2007 | | |
| JP | 2007307274 A | 11/2007 | | |

* cited by examiner

Primary Examiner — Reginald Alexander
(74) Attorney, Agent, or Firm — Dority & Manning, P.A.

(57) ABSTRACT

A method for brewing Japanese-style iced coffee with a single-serve beverage dispenser includes dispensing heated water onto coffee grounds disposed within a brew chamber of a brew module, flowing brewed coffee from the brew chamber into an ice chamber of an iced coffee module, the brewed coffee flowing over ice within the ice chamber, and flowing the iced brewed coffee from the ice chamber into a container. A related single-serve beverage dispenser is also provided.

12 Claims, 5 Drawing Sheets

JAPANESE-STYLE ICED COFFEE MAKER

FIELD OF THE INVENTION

The present subject matter relates generally to coffee makers and, more particularly, to coffee makers for Japanese-style iced coffee.

BACKGROUND OF THE INVENTION

In home, restaurant, and office settings, it is common for multiple individual users to enjoy a wide variety of beverages. For instance, individuals regularly enjoy coffee. Conventional coffee makers generally brew coffee and dispense the hot brewed coffee to a container, such as an individual mug or carafe. However, some individuals prefer iced coffee, and making iced coffee with conventional coffee makers can be difficult.

A coffee maker with features for making iced coffee, in particular Japanese-style iced coffee, would be useful.

BRIEF DESCRIPTION OF THE INVENTION

The present subject maker provides a coffee maker for making Japanese-style iced coffee. An iced coffee module can be mounted below an outlet of a single-serve beverage dispenser. The iced coffee module defines an ice chamber that may be filled with ice. During operation of the single-serve beverage dispenser, brewed hot coffee from the outlet of the single-serve beverage dispenser flows over the ice within the ice chamber. The ice advantageously dilutes and cools the brewed coffee, e.g., in order to reduce oxidation and produce smooth Japanese-style iced coffee. Aspects and advantages of the invention will be set forth in part in the following description, or may be obvious from the description, or may be learned through practice of the invention.

In one exemplary aspect of the present disclosure, a method for brewing Japanese-style iced coffee with a single-serve beverage dispenser includes dispensing heated water onto coffee grounds disposed within a brew chamber of a brew module, flowing brewed coffee from the brew chamber into an ice chamber of an iced coffee module, the brewed coffee flowing over ice within the ice chamber, and flowing the iced brewed coffee from the ice chamber into a container.

In another exemplary aspect of the present disclosure, a single-serve beverage dispenser includes a housing. A heating element is disposed within the housing. The heating element is operable to heat water. A brew module defines a brew chamber for receipt of a brew pod. An outlet of the brew module is disposed at a bottom portion of the brew module. Heated water from the heating element is followable into the brew chamber of the brew module. An iced coffee module defines an ice chamber for receipt of ice. The iced coffee module is mountable to the brew module at the bottom portion of the brew module such that coffee from the brew chamber is flowable into the ice chamber via the outlet of the brew module. An outlet of the iced coffee module is disposed at a bottom portion of the iced coffee module.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
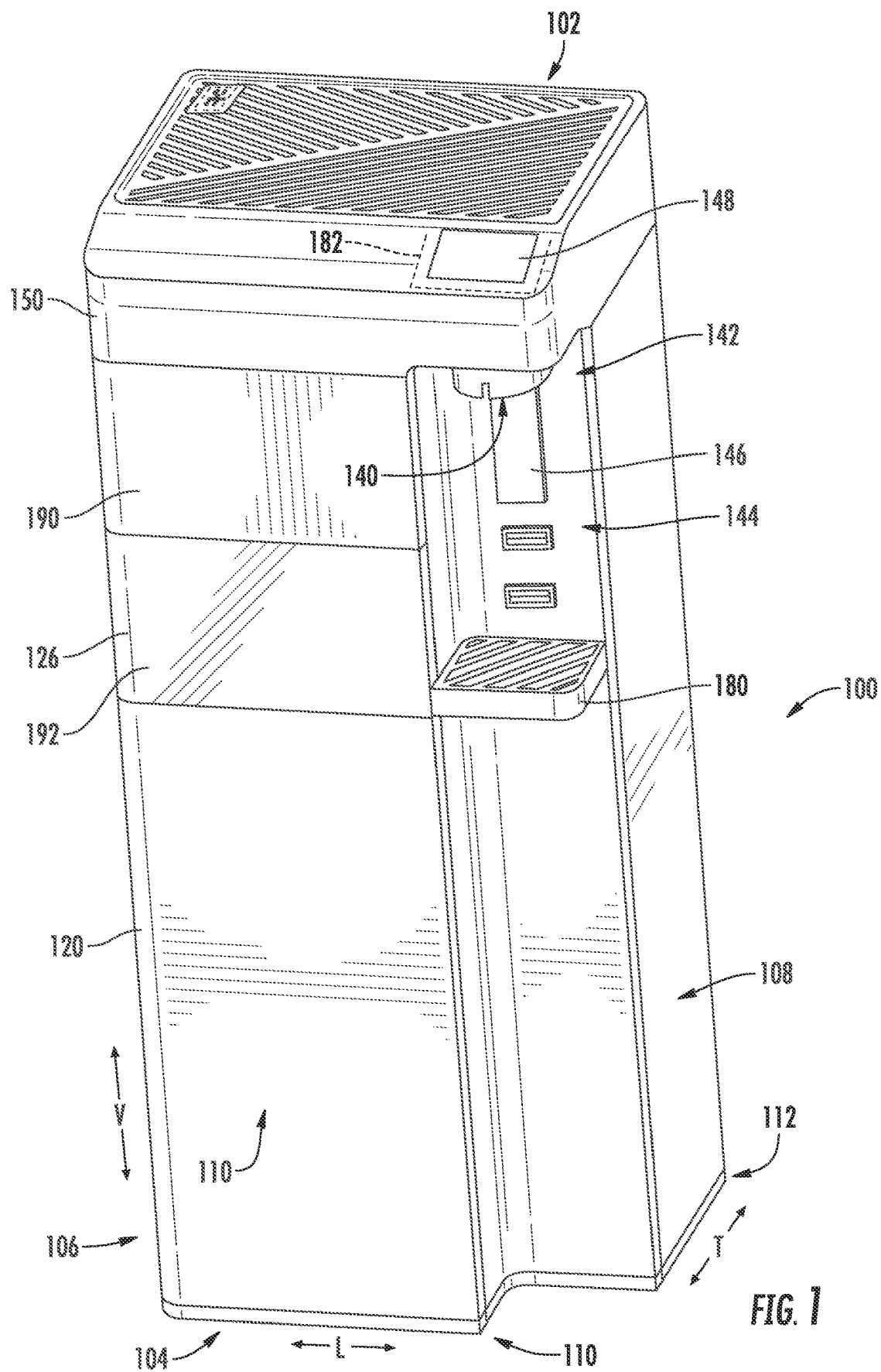
FIG. 1 is a front perspective view of a free-standing appliance according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative position with respect to a fluid flow along a fluid pathway. For example, "upstream" may refer to a position that is closer to an entrance of the fluid flow along the fluid pathway, and "downstream" may refer to a position that is closer to an exit of the fluid flow along the fluid pathway.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 shows a free-standing appliance 100 with a cabinet or housing 120 that extends between a top 102 and a bottom 104 along a vertical direction V; between a first side 106 and a second side 108 along a lateral direction L; and between a front 110 and a back 112 along a transverse direction T. Each of the vertical direction V, lateral direction L, and transverse direction T are mutually perpendicular and thus form an orthogonal direction system. It will be understood that, while described in greater detail below in the context of free-standing appliance 100, the present subject matter, including a brew module and an iced coffee module, may be used in or with any suitable single-serve beverage dispenser in alternative example embodiments.

Cabinet 120 supports or houses various components of free-standing appliance 100 to produce ice or dispense one more liquids, e.g., beverages, using a water source, such as a refillable internal water tank 170, e.g., removably held within cabinet 120. For instance, an icemaker 160 (FIG. 2) may be mounted within cabinet 120 downstream from water tank 170 to receive water therefrom and form ice, which may be supplied to a downstream ice bin 126 disposed within the cabinet 120. Additionally or alternatively, one or more water lines, such as a cold water line, a hot water line, or a carbonated water line, may be mounted to and/or within cabinet 120 downstream from water tank 170 to selectively dispense liquid(s) from one or more corresponding outlets. In certain example embodiments, icemaker 160 may be a nugget icemaker, such as the nugget icemaker described in U.S. Pat. No. 10,578,346, which is incorporated by reference in its entirety for all purposes.

Free-standing appliance 100 includes a delivery assembly 142 for delivering or dispensing one or more liquids, such as cold water, hot water, or carbonated water, from one or more outlets 140. In some embodiments, a dispenser recess 144 is defined below one or more of the outlets 140. Additionally or alternatively, an actuating mechanism 146, shown as a paddle, may be mounted below the outlet(s) 140, e.g., within dispenser recess 144, for operating delivery assembly 142. In alternative exemplary embodiments, any suitable actuating mechanism 146 may be used to operate delivery assembly 142. For example, delivery assembly 142 can include a sensor, such as an ultrasonic sensor, or a button rather than the paddle. In certain embodiments, a control panel 148 is provided, e.g., mounted to a top panel 150 of cabinet 120, for controlling the mode of operation. For example, control panel 148 may include a plurality of user inputs (not labeled), such as one or more buttons, knobs, or graphical user interfaces, e.g., presented on a touchscreen display, for selecting a desired mode of operation or beverage to be dispensed.

Operation of the free-standing appliance 100 can be regulated by a controller 152 that is operatively coupled to control panel 148 or various other components, as will be described below. Generally, in response to user manipulation of control panel 148 or one or more sensor signals, controller 152 may operate various components of the free-standing appliance 100. Controller 152 may include a memory and one or more microprocessors, CPUs or the like, such as general or special purpose microprocessors operable to execute programming instructions or micro-control code associated with operation of free-standing appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 152 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 152 may be positioned in a variety of locations throughout free-standing appliance 100. In the illustrated embodiments, controller 152 is located within top panel 150. In other embodiments, the controller 152 may be positioned at any suitable location within cabinet 120. Input/output ("I/O") signals may be routed between controller 152 and various operational components of free-standing appliance 100. For example, control panel 148 and delivery assembly 142 may be in communication with controller 152 via one or more signal lines or shared communication busses. Additionally or alternatively, controller 152 may be in communication with various other components of free-standing appliance 100. For example, various valves, switches, light sources, etc. may be actuatable based on commands from the controller 152. As discussed, control panel 148 may additionally be in communication with the controller 152. Thus, the various operations may occur based on user input or automatically through controller 152 instruction.

In optional embodiments, a power receptacle 154 having one or more electrical outlet plugs, e.g., standard 3-prong outlets, may be mounted to cabinet 120, e.g., at top panel 150. An electrical device, such as a coffee grinder or phone charger, having a mating inlet plug may selectively connect and disconnect from power receptacle 154.

Although free-standing appliance 100 is not limited to any specific shape or dimensions, free-standing appliance 100 may generally be sized to fit within a fairly small room, such as an office breakroom, commercial kitchen, or in place of a so-called water cooler (i.e., fountain).

Figure 2:
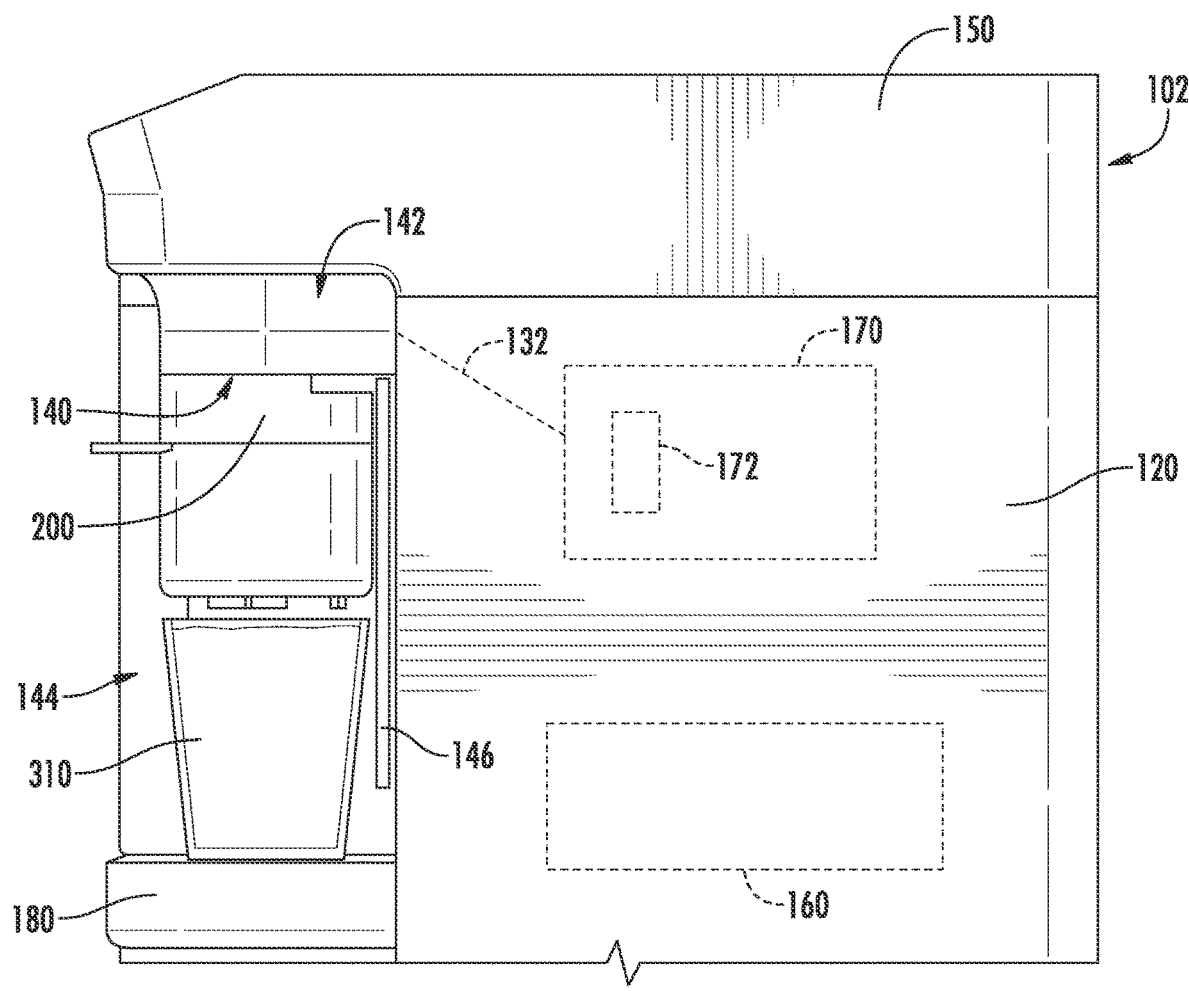
FIG. 2 is a partial side, elevation view of the example free-standing appliance of FIG. 1.
Figure 3:
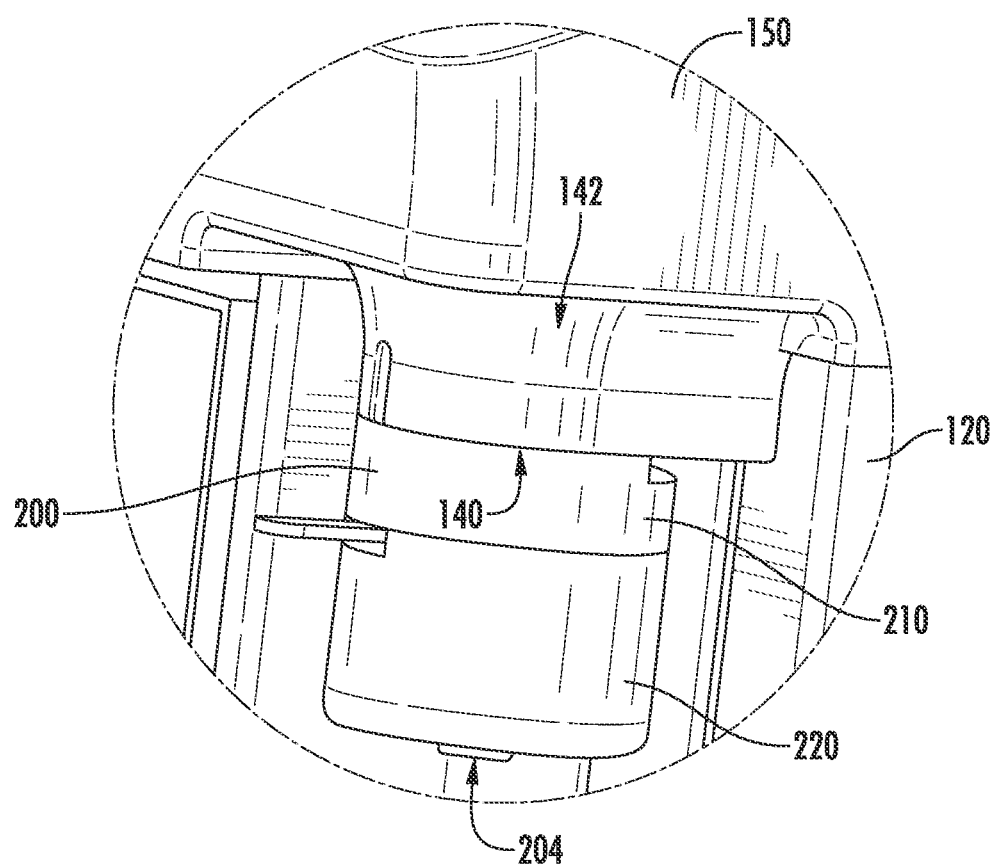
FIG. 3 is partial elevation view of a brew module and an iced coffee module according to an example embodiment of the present subject matter mounted at an outlet of the example free-standing appliance of FIG. 1.

With reference to FIG. 2, one or more hot water lines 132 may be provided within cabinet 120. For instance, hot water line 132 may extend to one or more outlets 140 disposed at delivery assembly 142. Water flow from water tank 170 to hot water line 132 may be directed by one or more valves or a pump. Generally, a heating element or heater 172 is provided along the hot water line 132 to selectively heat water upstream from outlets 140. In some embodiments, water tank 170 is a heater tank, in which a suitable volume of hot water may be held or maintained. Heater 172 may be an electric heating element, e.g., a resistive heating wire, resistive thermal element, such as a CALROD®, an inductive heating element, etc., mounted within water tank 170, e.g., to selectively heat the water therein. During use, heater 172 may thus be selectively activated, e.g., by controller 152, to generate or maintain a volume of water between, for instance, one hundred and sixty degrees Fahrenheit (160° F.) and two hundred and ten degrees Fahrenheit (210° F.).

A brew module 200 is provided to aid in the generation or dispensing of one or more hot beverages. For instance, brew module 200 may define a brew chamber 202 in which a brew pod 300 (FIG. 5), such as a sealed, disposable cup, or reusable mesh cup, may be received downstream from outlets 140. In some embodiments, brew module 200 is mountable within dispenser recess 144 such that brew module 200 can be in fluid communication with a hot water outlet when mounted within dispenser recess 144. For example, when brew module 200 is installed on delivery assembly 142, an inlet of the brew module 200 may receive a water delivery tube 190 (FIG. 5) to receive heated water therethrough. Water deliver tube 190 may be loaded by a spring 192 toward or against brew module 200. During use, heated water from the heater 172 may thus flow into the brew chamber 202. Within brew module 200, heated water may mix with, dissolve, or extract portions of a particulate material (e.g., held in a brew pod) to form a liquid beverage (e.g., a liquid coffee), which may then exit brew module 200 through an outlet 204 defined through brew module 200 at a bottom portion of brew module 200.

Figure 4:
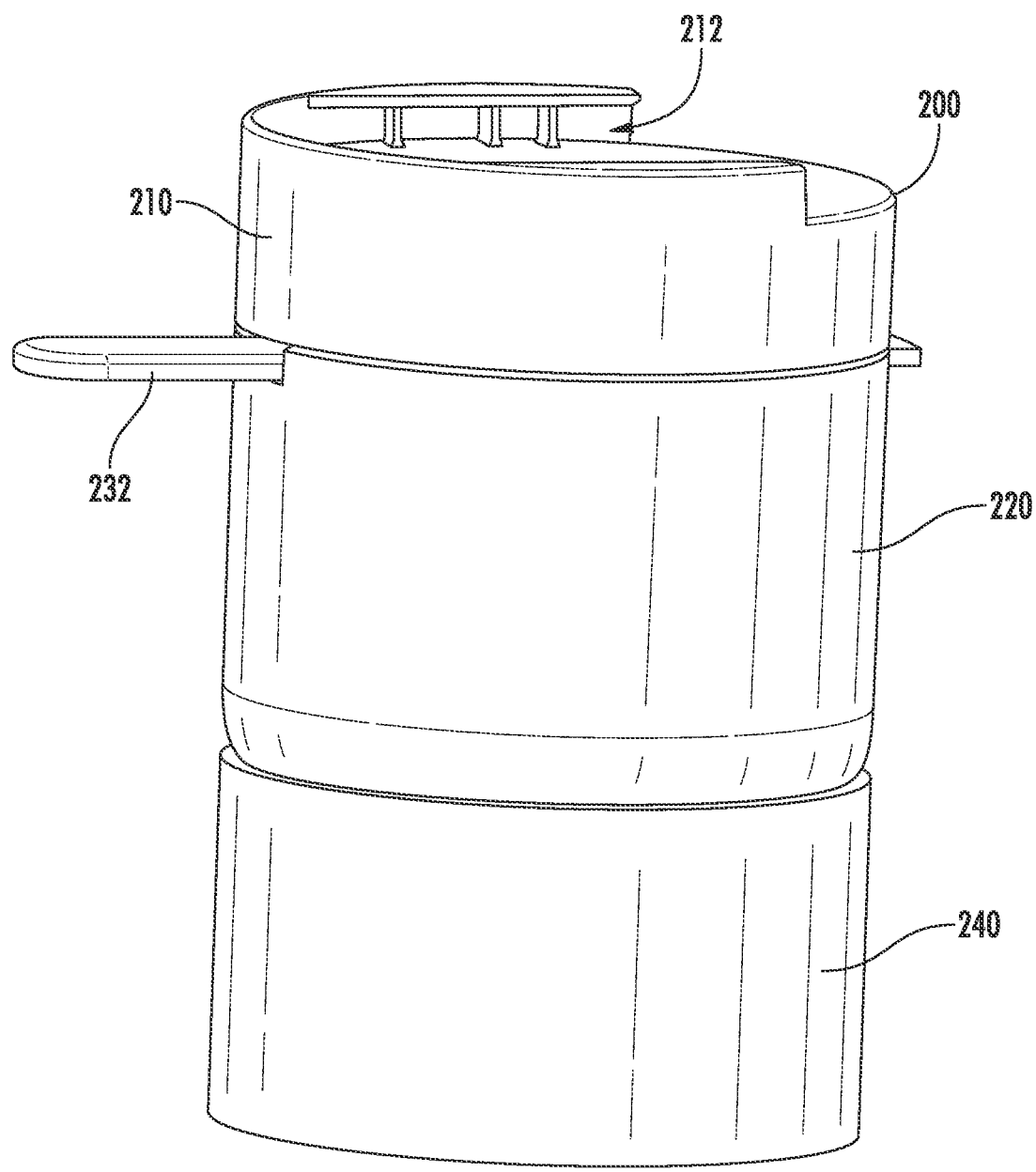
FIG. 4 is a perspective view of the example brew module and the example iced coffee module of FIG. 3.
Figure 5:
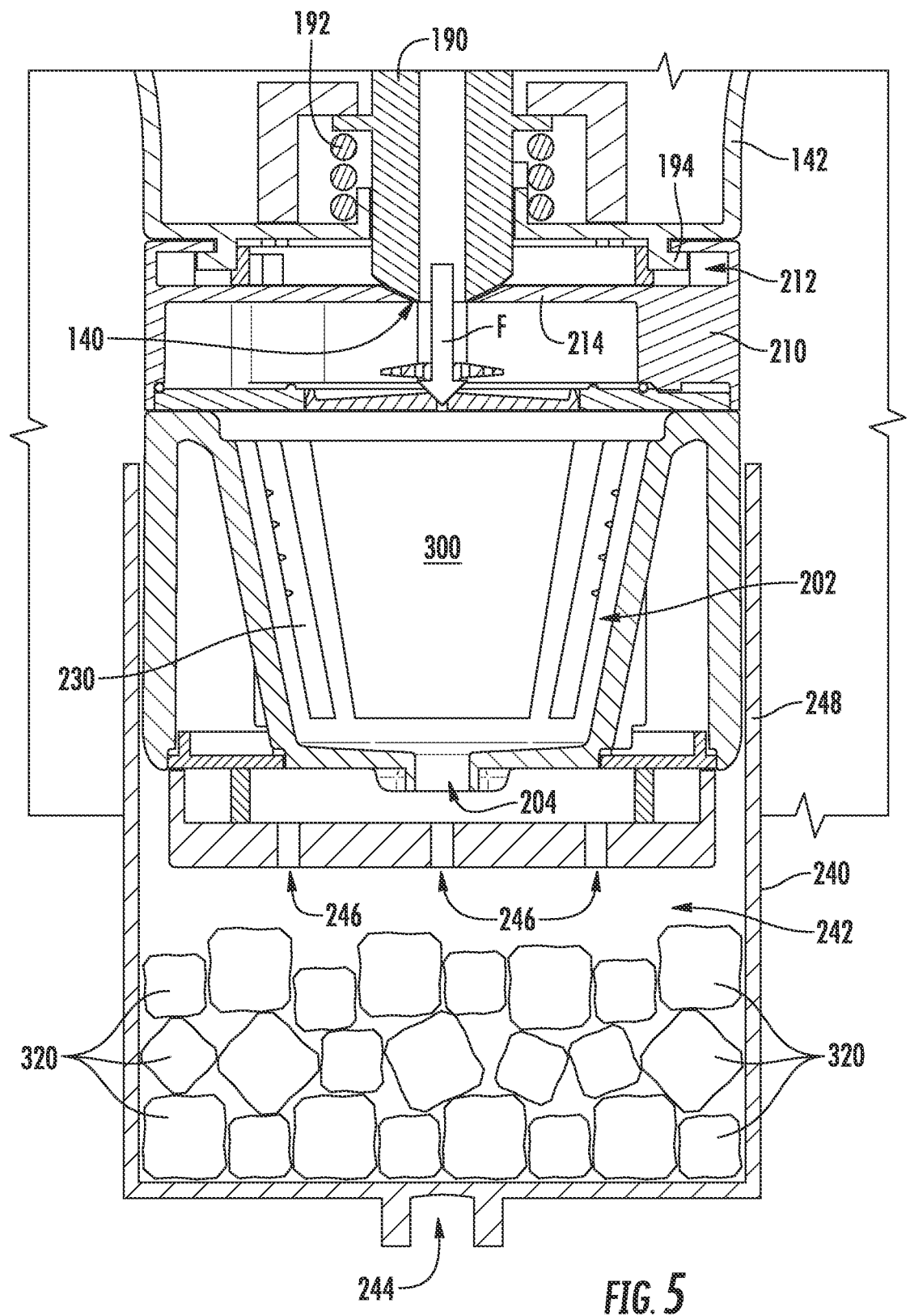
FIG. 5 is a section view of the example brew module and the example iced coffee module of FIG. 3.

With reference to FIGS. 4 and 5, brew module 200 may include a base 210 and a case 220. Base 210 may be removably mountable on delivery assembly 142 within dispenser recess 144. For instance, base 210 may define a mounting slot 212 at a top portion of base 210, and base 210 may slide onto projections 194 at delivery assembly 142 in order to mount base 210 to cabinet 120. Case 220 may define brew chamber 202 therein, and case 220 may be removably mounted to base 210. For example, case 220 may be treaded, snap-fit, or otherwise removably mountable to base 210. A basket 230 may be received within case 220 at brew chamber 202. A handle 232 of basket 230 may extend outwardly from brew chamber 202. Ground coffee beans or a brew pod 300 may be loaded into basket 230. Alternatively, brew pod 300 may be loaded directly into brew chamber 202 without basket 230.

An iced coffee module 240 is provided to aid in the generation or dispensing of one or more iced coffee beverages. As described in greater detail below, iced coffee module 240 cooperates with brew module 200 to brew Japanese-style iced coffee, e.g., rather than dispensing hot coffee as with using only brew module 200. Iced coffee module 240 may define an ice chamber 242 in which ice 320 (FIG. 5) may be received downstream from outlet 204 of brew module 200. In some embodiments, iced coffee module 240 is mountable within dispenser recess 144 such that iced coffee module 240 can be in fluid communication with outlet 204 of brew module 200. For example, when iced coffee module 240 is installed on brew module 200, an inlet of iced coffee module 240 may receive outlet 204 of brew module 200. During use, brewed coffee from brew module 200 may thus flow into the ice chamber 242. Within iced coffee module 240, the brewed coffee flows over ice 320 in order to advantageously dilute and flash cool the brewed coffee, e.g., and thus reduce oxidation and produce smooth Japanese-style iced coffee, which may then exit iced coffee module 240 through an outlet 244 defined through iced coffee module 240 at a bottom portion of iced coffee module 240.

With reference to FIGS. 4 and 5, iced coffee module 240 may include a side wall 248. Side wall 248 may be shaped to complement brew module 200, e.g., case 220. Side wall 248 may be removably mountable on brew module 200 within dispenser recess 144. For instance, case 220 may be received within side wall 248 or otherwise engage brew module 200 in order to mount iced coffee module 240 to brew module 200. Iced coffee module 240 may be treaded, snap-fit, or otherwise removably mountable to brew module 200.

Iced coffee module 240 may define a plurality of inlets 246 at a top portion of iced coffee module 240. Inlets 246 may be disposed upstream of ice chamber 242, e.g., such that inlets 246 are disposed between outlet 204 of brew module 200 and ice chamber 242. Inlets 246 may be distributed over the top of ice chamber 242. Having multiple inlets 246 may facilitate dispersion of brewed coffee from brew module 200 across ice chamber 242. Inlets 246 may include no less than seven inlets in certain example embodiments, e.g., in order to advantageously facilitate dispersion of brewed coffee from brew module 200 across ice chamber 242.

Iced coffee module 240 may be sized to advantageously provide a single serving of Japanese-style iced coffee. For example, a volume of ice chamber 242 may be no less than fifty cubic centimeters (50 cm$^3$) and no more than one hundred and fifty cubic centimeters (150 cm$^3$). Thus, e.g., ice 320 may be loaded into ice chamber 242 (e.g., may fill ice chamber 242) without concern for overly diluting brewed coffee from brew module 200 as the ice 320 in ice chamber 242 melts, and Japanese-style iced coffee may be brewed in a convenient manner with a single serve beverage dispenser, such as free-standing appliance 100.

An example method for operating brew module 200 and iced coffee module 240 to brew Japanese-style iced coffee with a single-serve beverage dispenser will now be described. Initially, the single-serve beverage dispenser, such as free-standing appliance 100, may be operated such that heater 172 generates heated water. The heated water may be dispensed onto coffee grounds within the brew chamber 202 of brew module 200. The coffee grounds may be disposed within brew pod 300 and/or within basket 230. The heated water may mix with, dissolve, or extract portions of the coffee grounds to form brewed coffee within brew chamber 202. The temperature of the brewed coffee within brew chamber 202 may be no less than one hundred and forty degrees Fahrenheit (140° F.) and no greater than two hundred and ten degrees Fahrenheit (210° F.).

The brewed coffee exits brew module 200 and enters iced coffee module 240. Moreover, the brewed coffee flows out of brew chamber 202 at outlet 204 and flows into ice chamber 242 via inlets 246. Within ice chamber 242, the brewed coffee flows over ice 320. The ice 320 melts in order to advantageously dilute and flash cool the brewed coffee, e.g., and thus reduce oxidation and produce smooth Japanese-style iced coffee. The iced coffee then exits iced coffee module 240 through outlet 244, e.g., into a container 310 disposed within dispenser recess 144 on a shelf 180.

A volume of ice 320 within ice chamber 242 may be advantageously selected to provide a single serving of Japanese-style iced coffee. For example, a volume of the ice 320 within ice chamber 242 may be no less than fifty cubic centimeters (50 cm$^3$) and no more than one hundred and fifty cubic centimeters (150 cm$^3$). Moreover, the volume of heated water dispensed onto coffee grounds within the brew chamber 202 may be advantageously selected to form a single serving of Japanese-style iced coffee. For example, a volume of the heated water dispensed into brew chamber 202 may be no less than one hundred milliliters (100 mL) and no more than two hundred and ninety milliliters (290 mL). Collectively, the volume of the heated water dispensed into brew chamber 202 and the melt water from the ice 320 within ice chamber 242 may form the iced coffee within iced coffee module 240. A volume of the iced brewed coffee may be no less than two hundred milliliters (200 mL) and no more than five hundred and eighty milliliters (580 mL), in certain example embodiments. Using nugget ice as ice 320 may facilitate complete melting of ice 320, e.g., due to the flakes that make nugget ice, facilitating melting relative to solid ice cubes.

The heated water may be automatically dispensed in response to an iced coffee user input at control panel 148. For example, a user may actuate the iced coffee user input on control panel 148 in order to initiate the brewing of Japanese-style iced coffee with brew module 200 and iced coffee module 240 describe above. A volume of heated water automatically dispensed in response to the iced coffee user input may be less than the volume of the heated water automatically dispensed in response to a brewed coffee user input at control panel 148. Thus, less heated water may be dispensed from outlet 140 when brewing ice coffee with both brew module 200 and iced coffee module 240, and more heated water may be dispensed when brewing hot coffee with only brew module 200. In certain example embodiments, the volume of heated water automatically dispensed in response to the iced coffee user input may be about half the volume of heated water that is automatically dispensed in response to the brewed coffee user input. Thus, a strength of the coffee brewed within brew module 200 in response to the iced coffee user input may be greater than the strength of the coffee brewed within brew module 200 in response to the brewed coffee user input.

As may be seen from the above, iced coffee module 240 may be placed directly under a drip brewing system to flash cool coffee. Excellent iced coffee may be brewed with iced coffee module 240 by brewing coffee at twice the regular strength (i.e., the strength when brewing coffee without iced coffee module 240) and then immediately cooling the brewed coffee with ice within iced coffee module 240. The ice melts and dilutes the coffee to regular strength. The Japanese-style iced coffee may be flash-chilled by ice 320 within iced coffee module 240 immediately after brewing the coffee within brew module 200. The ratio of ice to heated water used to brew coffee grounds to ice used to cool the brewed coffee may be about one to one (1:1) in order to avoid diluting or watering down the Japanese-style iced coffee.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A single-serve beverage dispenser, comprising:
a housing;
a heating element disposed within the housing, the heating element operable to heat water;
a water delivery tube in flow communication with the heating element;
a brew module defining a brew chamber for receipt of a brew pod, an outlet of the brew module disposed at a bottom portion of the brew module, heated water from the heating element followable into the brew chamber of the brew module via the water delivery tube; and
an iced coffee module defining an ice chamber for receipt of ice, the iced coffee module mountable to the brew module at the bottom portion of the brew module such that coffee from the brew chamber is flowable into the ice chamber via the outlet of the brew module, an outlet of the iced coffee module disposed at a bottom portion of the iced coffee module,
wherein the water delivery tube is loaded by a spring toward or against the brew module.

2. The single-serve beverage dispenser of claim 1, wherein a volume of the ice chamber is no less than fifty cubic centimeters and no more than one hundred and fifty cubic centimeters.

3. The single-serve beverage dispenser of claim 1, wherein the plurality of inlets of the iced coffee module are disposed at a top portion of the iced coffee module.

4. The single-serve beverage dispenser of claim 3, wherein the plurality of inlets comprises no less than seven inlets.

5. The single-serve beverage dispenser of claim 1, further comprising an icemaker disposed within the housing.

6. The single-serve beverage dispenser of claim 5, wherein the icemaker is a nugget icemaker.

7. A single-serve beverage dispenser, comprising:
a housing defining a dispenser recess;
a hot water line provided within the housing;
a delivery assembly positioned within the dispenser recess, the hot water line extending to one or more outlets of the delivery assembly;
a heating element provided along the hot water line to selectively heat water upstream from the one or more outlets of the delivery assembly;
a brew module defining a brew chamber for receipt of a brew pod, the brew module defining an outlet disposed at a bottom portion thereof; and
an iced coffee module comprising a side wall and a plate, the side wall being removable mountable on the brew module, the plate being disposed within the side wall and positioned below the outlet of the brew module, the plate defining a plurality of inlets, the bottom portion of the side wall defining an outlet,
wherein the plate and a bottom portion of the side wall define an ice chamber for receipt of ice.

8. The single-serve beverage dispenser of claim 7, wherein a volume of the ice chamber is no less than fifty cubic centimeters and no more than one hundred and fifty cubic centimeters.

9. The single-serve beverage dispenser of claim 7, wherein the plate is disposed at a top portion of the iced coffee module.

10. The single-serve beverage dispenser of claim 9, wherein the plate defines no less than seven inlets.

11. The single-serve beverage dispenser of claim 7, further comprising an icemaker disposed within the housing.

12. The single-serve beverage dispenser of claim 11, wherein the icemaker is a nugget icemaker.

* * * * *